May 19, 1964     F. D. WERNER     3,133,442
LEVEL SENSOR
Filed May 23, 1962     2 Sheets-Sheet 1
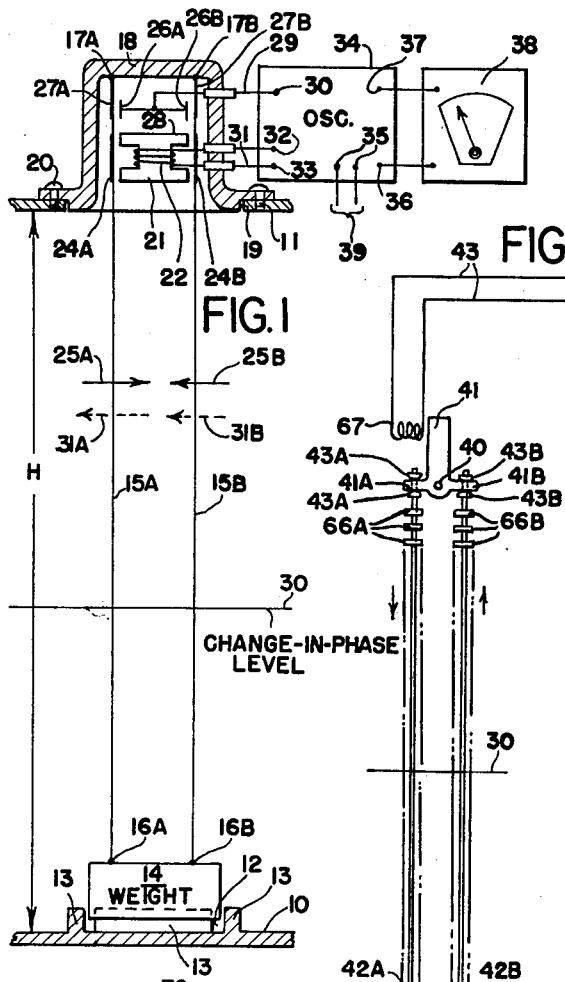
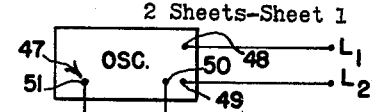
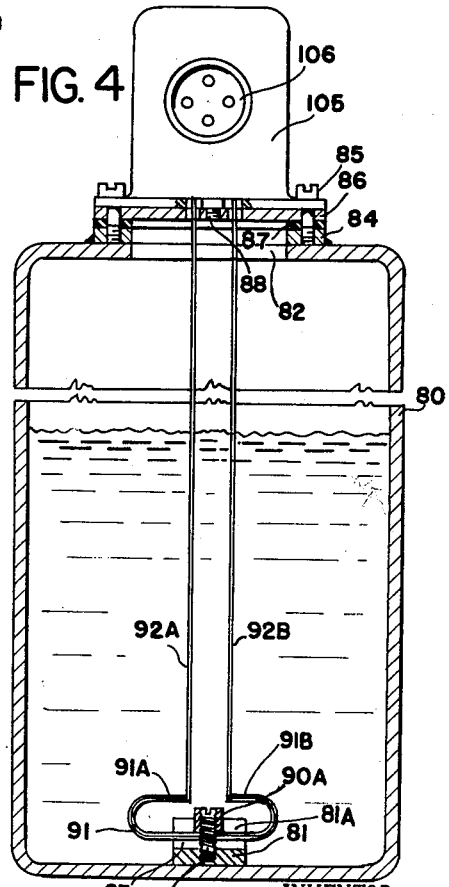
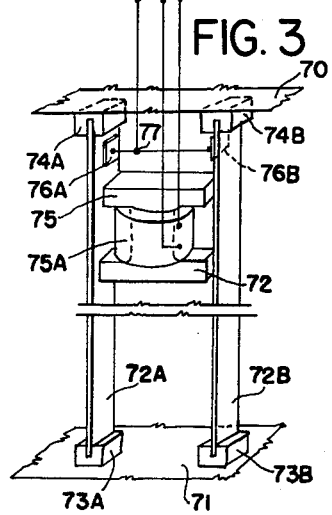
INVENTOR.
FRANK D. WERNER
BY Dugger & Johnson
ATTORNEYS May 19, 1964
F. D. WERNER
3,133,442
LEVEL SENSOR
Filed May 23, 1962
2 Sheets-Sheet 2
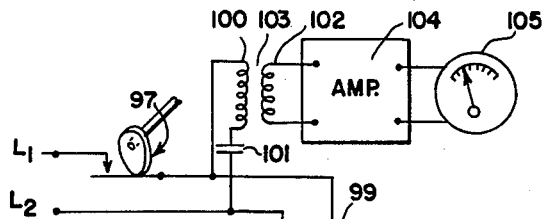
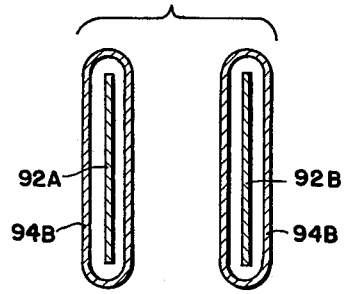
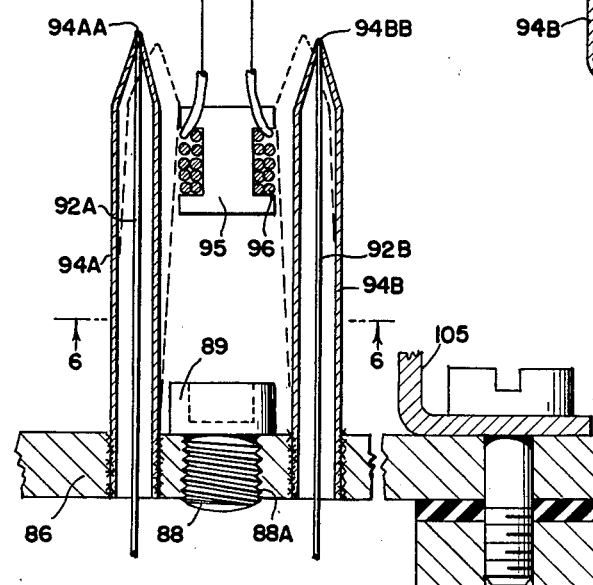
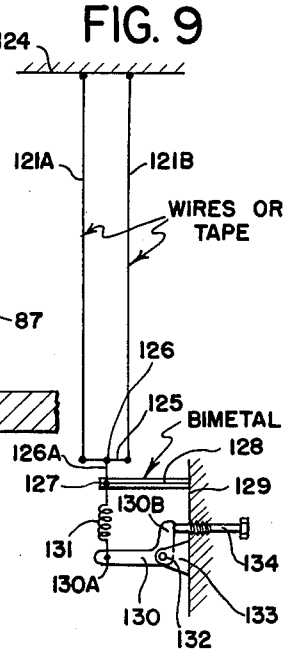
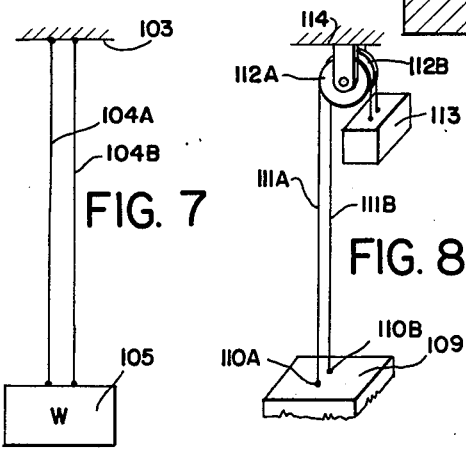
*INVENTOR.*
FRANK D. WERNER
BY *Dugger & Johnson*
ATTORNEYS

United States Patent Office 3,133,442
Patented May 19, 1964

3,133,442
LEVEL SENSOR
Frank D. Werner, Minneapolis, Minn., assignor to Rosemount Engineering Company, Minneapolis, Minn., a corporation of Minnesota
Filed May 23, 1962, Ser. No. 197,005
16 Claims. (Cl. 73—290)

This invention relates to devices for measuring the distance from a fixed position downward to a level at which a change in phase occurs. The most common of such devices are liquid level sensing devices wherein air (or other gas) is above the level of the liquid. There are other situations in which a change of phase occurs, as for example in tanks holding flowable solids such as grain, cement, coal or the like granular or powdered solids, with air or gas above. Tanks having petroleum fuel floated on water (by which the fuel is displaced) are another example. These illustrate various situations wherein this invention has usefulness.

This invention is more particularly an improvement in that form of level measuring devices wherein a vibratory member is provided reaching from the bottom to the top of the space in which measurement is to be made. In such devices, the vibratory member can be caused to vibrate either continuously or pulses may be imposed thereon. When the vibratory member is caused to vibrate continuously, the period of vibration is measured as an indication of depth. When single pulses are imposed upon the vibrating member, the time between the initiation of the pulse and the arrival of the reflected pulse (echo) is read for determining the depth. Such time interval is likewise determined by the period of vibration of the member. The present invention is an improvement useful with either such mode of operation.

Of all prior devices of the aforesaid types, the vibrating member has stiffness in bending and/or in shear and suitable motoring (or driving) and sensing devices are provided for imposing vibration on said member and sensing the vibratory rate (or period of reflection of pulses). The vibrating member then vibrates at a rate determined by said stiffness and by the length of such member which is free to vibrate; i.e. where the member stretches through a height of liquid (or solid) and has a portion above the liquid (or solid), which is in a different phase (air, gas, or other liquid), the free portion will be the effective length and the period of vibration is determined accordingly. Thus, in general, it is the free portion of the vibrating member which is above the level at which the change-of-phase occurs; (that is, from liquid to gas or solid to gas or from liquid to another lighter liquid) which determines the frequency as to the stiffness, the greater the stiffness for a given length, the higher the frequency of vibration.

The vibrating member can, if desired, be comparatively free of bending stiffness, i.e. a chain, and it will work very well, provided it has tension. The higher the tension for a given length, the higher the frequency of vibration. This tension can be varied to effect calibration adjustment or temperature compensation.

Such prior devices are subject to the disadvantages that they are subject to errors due to transient lateral (transverse or longitudinal) vibration. Since the vibrating member vibrates laterally (or longitudinally) due to imposed vibration of its motoring coil and the signal is likewise due to such vibration, it follows that a transient vibration due to extraneous causes, having a component in a like direction, will result in a false and erroneous signal.

It is an object of the present invention to provide an improved level sensor wherein errors due to transient vibrations are so minimized as to be of no consequence or are eliminated. It is a further object of the invention to provide a level sensor wherein the vibrating member is composed of parallel vibrator elements which are vibrated in opposition. It is a further object of the invention to provide an improved level sensor composed of vibrating members of which are vibrated substantially out of phase with each other during operation. It is another object of the invention to provide an improved level sensor which is self-contained, temperature compensated, and free from significant errors due to transverse vibrations. It is another object of the invention to provide level indicators of the aforesaid types wherein calibration and/or compensation for temperature variations is provided.

Other and further objects are those inherent in the invention herein illustrated, described and claimed and will be apparent as the description proceeds.

To the acomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention is illustrated with reference to the drawings wherein:

FIGURE 1 is a vertical side elevational view partly schematic and partly in section of one illustrative embodiment of the invention;

FIGURE 2 is a vertical side elevational view, partly schematic and partly in section of another illustrative embodiment of the invention;

FIGURE 3 is a fragmentary isometric side view showing another illustrative form of the invention;

FIGURES 4, 5 and 6 show another embodiment of the invention. FIGURE 4 is a vertical sectional view showing a container in which the invention is embodied, with the sensor enclosed. FIGURE 5 is a fragmentary vertical sectional view with portions shown schematically of the upper mounting of the vibrating elements of the form of invention shown in FIGURE 4, and FIGURE 6 is a horizontal sectional view taken along the line and in the direction of arrows 6—6 of FIGURE 5.

FIGURES 7, 8 and 9 are vertical side elevational views showing various ways in which tension is applied to the vibrating members.

Referring to FIGURE 1, the improved level sensor of the present invention is incorporated in a tank having a bottom 10, top 11 and height H. On the bottom is a small well 12 defined by walls 13 so as generally to locate a weight 14 which is of less area than the well 12 and free to hang therein. Weight 14 is suspended by parallel vibrating members 15A and 15B which are each symmetrically attached at 16A and 16B to weight 14 and extend upwardly and are anchored at 17A and 17B to the inside of an inverted removable cup 18 of the upper suspension. Cup 18 is flanged at its lower edge so as to permit location in hole 19 in the tank top in a position above well 12 or lower. The cup is detachably secured to the tank top by screws 20—20.

Vibrating members 15A and 15B may be wires, tapes, chains, strands, light bars, etc. The weight 14 may be varied unduly. Thus, if members 15A and 15B are light bars, suspended by their upper ends, the weight 14 can be reduced in size or eliminated entirely as in FIGURE 2. When the members 15A and 15B are wires, tapes, chains and such-like strands, a weight or other attachment at the bottom is desirable. Other forms of bottom and top attachments are illustrated in FIGURES 2, 3, 4, and 7–9. Loading of the vibrator strands can be used as shown in my application entitled Level Indicator, executed of even date herewith, Serial No. 197,013, filed May 23, 1962.

Vibrating members 15A and 15B thus extend generally parallel to each other from the bottom to the top of the top and the tank and are under similar tension since they are symmetrically attached to a bottom attachment, here illustrated as weight 14. While these members can vibrate in any direction, provision is made for applying motivating force to them to cause their simultaneous vibration substantially 180° out of phase with each other. Forms of motivating and sensing circuits suitable for use in this invention are well known, as for example, in Patents 2,584,128 and 2,472,249. Thus, within cup 18 there is mounted (by a bracket, not shown) a magnetic core 21 having winding 22 thereon. The vibrating members 15A and 15B need not be of magnetic material throughout their length, but can be made so if convenient. Where made of other than magnetic material, a small armature of magnetic material is provided at 24A and 24B. This can be plated on or otherwise attached. Where the vibrating members are of magnetic material, the separate armature sections are not needed and may be omitted. Accordingly, when core 22 is magnetized, member 15A will be moved in the direction of arrow 25A, and member 15B will be moved in the direction of arrow 25B. When the core is demagnetized, the members will be free to be moved in, respectively, the opposite directions, and vibration is established which is a function of the length of the members above the change-in-phase level at 30.

Within cup 18 and above or adjacent core 21 there are mounted by brackets, not shown, a pair of vibration sensors, here illustrated as electrical condenser plates 26A and 26B, and adjacent these on the vibrating members 15A and 15B there are provided electrically conductive segments 27A and 27B respectively, which connect to cup 18. When the vibrating members 15A and 15B are themselves electrically conductive, it is unnecessary to provide separate segments 27A and 27B.

The two plates 26A and 26B are connected at junction 28 and lead 29 brought out to terminal 30 of oscillator 34. Winding 22 is connected via leads 31 to terminal 32—33 of oscillator 34. Power is supplied at 39 to oscillator terminals 35. Terminals 37 and 36 of the oscillator are the frequency indicator terminals thereof and are connected to frequency meter 38 which is calibrated in fractions of height H of tank 10—11.

In operation, oscillator 34 receives a capacitative signal via plates 26A—26B which is fed back to the oscillator thereby determining the frequency of the power supplied at terminals 32—33. The output of said terminals 32—33 is fed back coil 22 on core 21, which is magnetized and motivates the members 15A and 15B to move towards each other when the coil is energized. The waves thus imposed upon members 15A and 15B travel down to the change-in-phase level 30 which therefore determines the period of vibration of the members 15A and 15B. Oscillator 34 being controlled by the signals at 26A and 26B sustains the vibrations, the frequency of which are thus determined by the position of the interphase level 30.

Transient vibrations may have either a vertical or horizontal component. The vertical component merely moves the whole members 15A and 15B up and down parallel to plates 26A and 26B and therefore does no harm. However, a component of transient vibration which is transverse to the members 15A and 15B will move both members simultaneously in the same direction as denoted by arrows 31A and 31B. Each member 15A and 15B moves relative to its plate 26A and 26B respectively and produces a signal, but the movement is such that the signal of one member 15A relative its plate 26A is just opposite to the signal of the other member 15B relative its plate 26B, and one transient-induced signal cancels the other. Accordingly, transient vibrations are accepted without materially affecting the signal read-out at 38.

In FIGURE 2 there is shown a form of the invention wherein the vibrating sensor elements are vibrated in an axial direction. For this purpose there is provided a pivot mounting 40 which is mounted in a suitable cup-closure, such as cup 18 of FIGURE 1, which in turn is mounted on the tank top 11. On pivot 40 there is mounted an armature 41 having right angularly extending integral legs 41A and 41B which are apertured. Through the apertures there extends the rods 42A and 42B which are provided along this length with little disks 66A and 66B. These can be of any shape, mass and configuration as disclosed in my aforementioned copending application entitled Level Sensor Serial No. 197,013. The rods extend generally parallel and upward through the tank space. At their tops, the rods 42 and 42B pass, respectively, through apertures in the legs 41A and 41B and are retained by disked collars 43A and 43B. These collars hold the rods against endwise movement relative to the legs 41A and 41B but permit enough swinging movement so that movement of the armature 41 does not impart any substantial transverse movement to the rods. Pivotal attachments between the legs 41A and 41B and the rods 42A and 42B respectively, may be substituted, but the pivots should have substantially zero-clearance. The bottoms of the rods may hang free or be supported in holes in a block 65 attached to the tank bottom. Movement of rods 42A and 42B in an axial direction is not restrained by blocks 65. In the FIGURE 2 system, the motivating read-out system is like Patent 2,709,918, and consists of a pulse wave oscillator 47 fed with power from lines L1 and L2 at terminals 48—49. Output terminals 50—51 of the oscillator are connected to terminals 52—53 respectively of divider 54, ground being provided at 59A. Divider 54 serves to interrupt the oscillator signal and form pulses, which are delivered at terminals 56—57 which are connected through condenser 58 and grounded lead 59B to sensor 71, terminals 60—61 and through the sensor 71 are delivered to terminals 44—45 and thence via lines 43 to motor coil 67. Sensor 71 reads the time between a pulse wave delivered via 60—61 to terminals 44—45 and the signal wave received back at terminals 44—45. This time is then read at meter 64 connected to terminals 62—63.

The present invention is accordingly applicable to systems wherein the vibrating members vibrate with sustained vibrations (FIGURE 1) or are vibrated according to the pulse wave method (FIGURE 2). FIGURE 1 also illustrates how the invention is applicable to sensors vibrated transversely, and FIGURE 2 illustrates how the invention is applied to sensors vibrated longitudinally.

In the present invention the vibrating members (15A and 15B; 42A and 42B; 72A and 72B; 92A and 92B) can be of a variety of materials and shapes. It is not necessary that the members have significant bending stiffness. A construction having no stiffness in bending (example: a chain or plastic strip) will serve. Materials may have some bending stiffness (as for the bars 42A and 42B of FIGURE 2), and these may be used without disadvantage, but bending stiffness of the material is not a pre-requisite for the vibratory members.

The vibratory members can be round wires, strands, flat strips, bars or chains. FIGURE 1 may be considered as generically illustrating both types (round or flat) and are so intended. FIGURE 2 shows light rods (bars). FIGURE 3 shows specifically self-supporting flat strip vibratory members 70A and 70B (without tension). It will be understood that various shapes and kinds of vibratory members may be wires used as desired in any of the systems of this invention.

Where the vibratory members are non-magnetic, a suitable magnetic armature is applied as needed to a short section adjacent the motivating coil as shown in FIGURE 1, or other motivation may be used as via a separate armature, or in FIGURE 2. Similarly, where the vibratory member is electrically non-conductive, it may have conductive surface applied thereto where needed, for capacitative pickup, where needed in the powering and indicating system used.

FIGURE 3 is somewhat similar to FIGURE 1 in that the vibratory sensor members are vibrated transversely. However, in FIGURE 3, the vibratory sensors 72A and 72B are self-supporting strips mounted between bottom and top flexible blocks, without tension. Thus, the lower end of strip 72A is seated in a slot in rubber block 73A fastened to tank bottom 71 and the upper end of strip 72A is seated in a slot in rubber block 74A, attached to tank top 70. Similarly, strip 72B is supported by seating its lower and upper ends in rubber blocks 73B and 74B respectively. The strips can be of ferromagnetic material or other metals and non-metals. In the case of nonmagnetic and electrically non-conductive materials, and where the vibration is produced and sensed as in FIGURES 1 and 3, magnetic armatures and sensor areas are affixed to the strips as at 24A and 24B and 27A and 27B in FIGURE 1. The system of FIGURE 3 has a motivating core 75 and coil 75A fed by leads 76 and sensor (capacitor) plates 76A and 76B connected together and through junction 78 and line 78. These are as described in FIGURE 1 and are similarly powered by an oscillator and provided with an indicator as at 38 in FIGURE 1.

FIGURES 4, 5 and 6 show a specific application of the invention to tankage containing explosive or corrosive materials or to liquids under pressure. The vibratory members can be of any of the types herein described and either the continuous wave form of excitation (FIGURE 1) or pulse wave form of excitation (FIGURE 2) may be employed, the pulse wave excitation and transverse vibration being illustrated.

In FIGURE 4, there is provided an enclosed tank 80 constructed of material and shaped suitable to the type of substance being stored and to the pressure within the tank. At the bottom of the tank there is provided a thick hold-down pad 81 with threaded apertures in it to receive screws 90.

At the top, the tank has a generous opening 82 with a thick rim 84 provided with threaded openings to receive attachment screws 85. Opening 82 is closed by cover plate 86 which seats on gasket 87 (sse FIGURE 5). Cover plate 86 has several threaded holes 88A which can be sealed by screws 88 when the unit is in operation. Hole 88A is aligned directly over hold-down stud 90 which serves to attach a bi-metal bottom anchorage 91 to pad 81. The anchorage 91 has two upwardly and inwardly curved arms 91A and 91B to which the bottom ends of vibratory members 92A and 92B are anchored. Members 92A and 92B are strips or wires. Pad 81 is slotted at 81A and stud 90 is centrally located to be received through a central hole in anchorage 91. Slot 81A keeps anchorage 91 from turning, but the anchorage can move up and down in the slot. On stud 90 there is a deep nut 90A which is adjusted up or down to position anchorage 91 thereby to adjust tension of vibratory members 92A and 92B. There is a clearance at 93 and anchorage 91 can therefore rock a little to equalize the tension on members 92A and 92B. The members 92A and 92B stretch up and generally parallel to each other, and at their top ends are welded (soldered or brazed) into the flattened together upper ends 94AA and 94BB of flat cross-section tubes 94A and 94B. Tubes 94A and 94B are welded (soldered or brazed) into slits in plate 86, and hence seal the plate against release of pressure (or spillage of corrosive liquid), but being flat and projecting upwardly, the tubes can be deflected a little from their relaxed position shown in full lines in FIGURE 5. In FIGURE 5 the tubes are shown moved together (towards each other) in the dotted line position, and in their unstressed condition in full lines.

Optionally, anchorage 91 can be fabricated of bi- metal so as to provide temperature compensation of tension where temperature variations are a problem. The objective is to maintain tension substantially constant.

Between the tubes 94A and 94B there is mounted (on a bracket not illustrated) an armature core 95 carrying coil 96 which acts as the motivating coil to move the vibratory members 92A and 92B and also acts as the readout coil to time the reflected signal, according to the pulse wave mode of operation illustrated. In FIGURE 5, a power source L1 and L2 is connected through cam operated switch 97 and lines 98 and 99 to coil 96. The primary 100 of transformer 103 is connected through capacitor 101 to lines 98 and 99. The reflected pulse received by coil 96 is thus applied through transformer 103 to the input of transformer 103 which has its secondary 102 connected to the input of amplifier 104, the output of which is connected to frequency meter 105 that is calibrated in "height" of liquid within tank 80.

The mode of mounting vibratory strip members 92A and 92B by means of flat tubes 94A and 94B enables a wide choice of materials to be used for the strips themselves. Since magnetic requirements can be provided by tubes 94A and 94B, it follows that strips 92A and 92B need not be magnetic, and any material may therefore be used for the strips. That is to say, tubes 94A and 94B can be magnetic and subjected to vibration and being attached to the vibratory members 92A and 92B respectively will cause the latter to vibrate and will be vibrated by them even though they are not of magnetic materials. Hence, members 92A and 92B can be made of any material desired. The whole plate 86 and unit are covered by cup 105 having suitable electrical connection 106 thereon as shown in FIGURE 4.

When the device is to be assembled, the gasket 87 is seated. Then the unit composed of plate 86 with tubes 94A and 94B mounted thereon with strips 92A and 92B sealed to the tubes and suspended down through them with anchorage 91 attached at their lower ends, is lowered through hole 82 and rotated to register the anchorage 91 with slot 81A and bring the hole in anchorage 91 into registry with stud 90. Plug 88 is not then in plate 86 and by means of a screw-holding screwdriver, nut 90A is lowered through holes 88A of plate 86 and screwed down on stud 90 to complete the assembly. Tension of strips 92A and 92B can be varied by turning nut 90A up or down on stud 90. The dimensions of strips 92A and 92B are such that when nut 90A is turned down, the arms 91A and 91B of anchorage 91 will be tensioned sufficiently to place the strips 92A and 92B in required tension. Then screw plug 88 is replaced, and this seals the unit. Cover 105 is then put on and screws 85 inserted and pulled down to seal the unit tightly. If desired, cover 105 can be attached by screws separate from screws 85, which in such event, only hold plate 86.

FIGURES 1, 2, 3, 4 and 7, 8 and 9 show various ways of tensioning and supporting the vibratory members, any of which can be used, as desired. In FIGURES 1 and 7, a simple weight (14 in FIGURE 1; 105 in FIGURE 7) is provided. The weight is symmetrically attached to the bottom ends of the vibratory members, which are therefore evenly tensioned. This mode of attachment works well in quiet locations. The members 104A and 104B of FIGURE 7 can be of the type shown primarily in FIGURE 1. Sometimes it is more desirable to have the weight at the top of the tank space, and in such event a solid attachment is made as at the bottom ends as at 110A and 110B to the bottom 109 of the tank as in FIGURE 8, and the vibratory members 111A and 111B are brought up over pulleys 112A and 112B (that are attached to tank top 114) and then carried down to a weight 113 to which they are symmetrically attached. The motivating and sensing devices for the vibratory members shown in FIGURES 7 and 8 are then placed between them up, near the top ends as shown in, for example, FIGURES 1 and 5.

In FIGURE 9 there is illustrated a temperature compensated adjustable attachment. Here the vibratory members 121A and 121B have their upper ends attached to tank top 124 and their lower ends attached to opposite ends of a symmetrical single-tree 125 by which the load on them is equalized. The center 126 of the single-tree which is pivotally attached by a link 126A to pivot 127 on the free end of bi-metal strip 128 which has its opposite end firmly supported on tank wall 129. A spring 131 is also pivotally attached to point 127 of the bi-metal strip and the lower end of the spring is pivotally attached to end 130A of bellcrank lever 130 which is pivoted at 132 to bracket 133 on tank wall 129. A screw 134 through tank wall 129 bears against end 130B of the bellcrank and rocks it to adjust the tension of spring 131. The bimetal strip bears more or less of the load of spring 131, and the balance of the load is imposed as tension forces (equally divided) on members 121A and 121B. This mode of attachment thus illustrates a temperature compensated spring tensioned mounting for vibratory members 121A and 121B which are accordingly tensioned variably, depending upon manual adjustment and according to temperature. This type of mounting is more suitable to those locations where tensioning by means of weight (mass) would impose unacceptable side results.

In general, it may be said that for best results, the pair of vibratory members should be substantially matched in weight, cross-section, and length, and where under tension, the tension should be substantially the same.

As many apparently widely different embodiments of this invention may be made without departing from the spirit and scope thereof, it is to be understood that I do not limit myself to the specific embodiments disclosed herein.

What I claim is:

1. A level sensor comprising a pair of elongated vibratory members positioned side-by-side and generally upright in the space in which level is to be sensed, means supporting said members for vibration, means for vibrating the members substantially 180° out of phase with each other and means responsive to the vibration of said members for indicating the rate of vibration.

2. The level sensor of claim 1 further characterized in that means for vibrating the members maintains said vibrations.

3. The level sensor of claim 1 further characterized in that the means for vibrating the members generates repeated pulses in said members and said means responsive measures the time period between each pulse and its return as a reflected wave.

4. The level sensor of claim 1 further characterized in that the vibratory members are vibrated transversely and in the phase of vibration of one member is opposite to the phase of vibration of the other member.

5. The level sensor of claim 1 further characterized in that the vibratory members are vibrated longitudinally and the phase of vibration of one member is opposite to the phase of vibration of the other member.

6. The level sensor of claim 1 further characterized in that the vibratory members are non-magnetic but are each provided with armature means cooperating with said vibratory members for vibrating said members.

7. The level sensor of claim 1 further characterized in that means are provided for substantially equally tensioning said vibratory members.

8. The level sensor of claim 1 further characterized in that said vibratory members are self supporting and are each mounted without appreciable endwise tension.

9. The level sensor of claim 1 further characterized in that the vibratory members are of a configuration and mounted so as to vibrate transversely.

10. The level sensor of claim 1 further characterized in that the vibratory members are of a configuration and are mounted so as to vibrate longitudinally.

11. A level sensor comprising a pair of vibratory members positioned side-by-side and generally upright in the space in which level is to be sensed, tubes enclosing a short portion of corresponding ends of the members, said tubes being sufficiently large internally so as not to touch the vibratory member when the tubes are moderately deflected, the free end of each tube being attached to its vibratory member, the opposite ends of each tube being attached to a common mounting, and anchoring means at the opposite ends of the vibratory members for tensioning them correspondingly, means for vibrating the free ends of the tubes and vibratory members in opposite phase and means responsive to the thus induced vibrations for indicating the rate of such vibration.

12. The level sensor of claim 11 further characterized in that means are provided for varying the tension on said members as a function of temperature.

13. The level sensor of claim 12 further characterized in that the space in which the level is to be sensed is wholly enclosed by a tank, and said tubes are sealed to the vibratory members and to said common mounting, which is in turn sealed to said tank.

14. The level sensor of claim 11 further characterized in that means are provided for manually adjusting the tension of said members.

15. The level sensor of claim 11 further characterized in that said common mounting is a spring device attached to said vibratory members for substantially equally tensioning them.

16. The level sensor of claim 11 further characterized in that the vibratory members are flat strips set parallel to each other and the tubes are flat cross-sectional in shape to enclose said strips without excess clearance.

No references cited.